United States Patent [19]

Kapadia et al.

[11] Patent Number: 4,488,240
[45] Date of Patent: Dec. 11, 1984

[54] VIBRATION MONITORING SYSTEM FOR AIRCRAFT ENGINES

[75] Inventors: Nikul S. Kapadia, El Toro; David J. Ray, San Juan Capistrano, both of Calif.

[73] Assignee: Becton, Dickinson and Company, San Juan Capistrano, Calif.

[21] Appl. No.: 344,561

[22] Filed: Feb. 1, 1982

[51] Int. Cl.³ .......................... G01N 29/04; G06J 1/00
[52] U.S. Cl. ...................... 364/508; 73/583; 73/660; 364/179; 364/724
[58] Field of Search ............... 364/508, 565, 569, 724, 364/728, 179; 340/347 P; 377/47, 48, 49; 73/579, 583, 609, 660

[56] References Cited

U.S. PATENT DOCUMENTS

| | | | |
|---|---|---|---|
| 3,449,553 | 6/1969 | Swan | 364/728 X |
| 3,639,848 | 2/1972 | Elliott | 328/167 |
| 3,708,746 | 1/1973 | Willet | 328/167 X |
| 3,717,756 | 2/1973 | Stitt | 364/728 |
| 3,758,758 | 9/1973 | Games et al. | 364/508 |
| 3,783,680 | 1/1974 | Mason | 73/660 X |
| 3,816,722 | 6/1974 | Sakoe et al. | 364/728 |
| 4,010,637 | 3/1977 | Harwell et al. | 73/660 X |
| 4,166,249 | 8/1979 | Lynch | 364/701 |
| 4,171,522 | 10/1979 | Powell | 340/347 P |
| 4,181,962 | 1/1980 | West, Jr. et al. | 364/565 |
| 4,213,114 | 7/1980 | Cochard | 340/27 R |
| 4,218,752 | 8/1980 | Hewes et al. | 364/724 |
| 4,302,813 | 11/1981 | Kurihara et al. | 364/508 |
| 4,323,980 | 4/1982 | Houdard et al. | 364/724 |
| 4,352,293 | 10/1982 | Kurihara et al. | 364/508 |
| 4,423,381 | 12/1983 | Stepp et al. | 377/48 |

OTHER PUBLICATIONS

Bray et al.: ENDEVCO Digital EVM: Microtrac ™, The Next Step in Airborne On-Condition Monitoring, May 1980.
ENDEVCO Sales Brochure: Model 6726 for Jet Engine Test Cells Programmable Tracking Filter, Nov. 1979.
ENDEVCO AVM System Proposal for Boeing Model 757 Airplane ScD S332T304-10-11, Jul. 14, 1980.

*Primary Examiner*—Felix D. Gruber
*Attorney, Agent, or Firm*—Marvin H. Kleinberg

[57] ABSTRACT

A vibration monitoring system for aircraft engines includes a nonrecursive digital filter network controlled by a data processor. Digital techniques process tachometer signals to general sampling signals at a frequency which is an integral multiple of the rotating frequency. A novel digital filter can track the rotational frequency of the rotating component and can be accurately centered upon that frequency. The digital filter includes a pair of memories, one of which stores constant coefficients and the other of which stores sampled data. The sampled data storage can accommodate the output of more than one sensor and data from each sensor can be alternatively processed.

12 Claims, 6 Drawing Figures

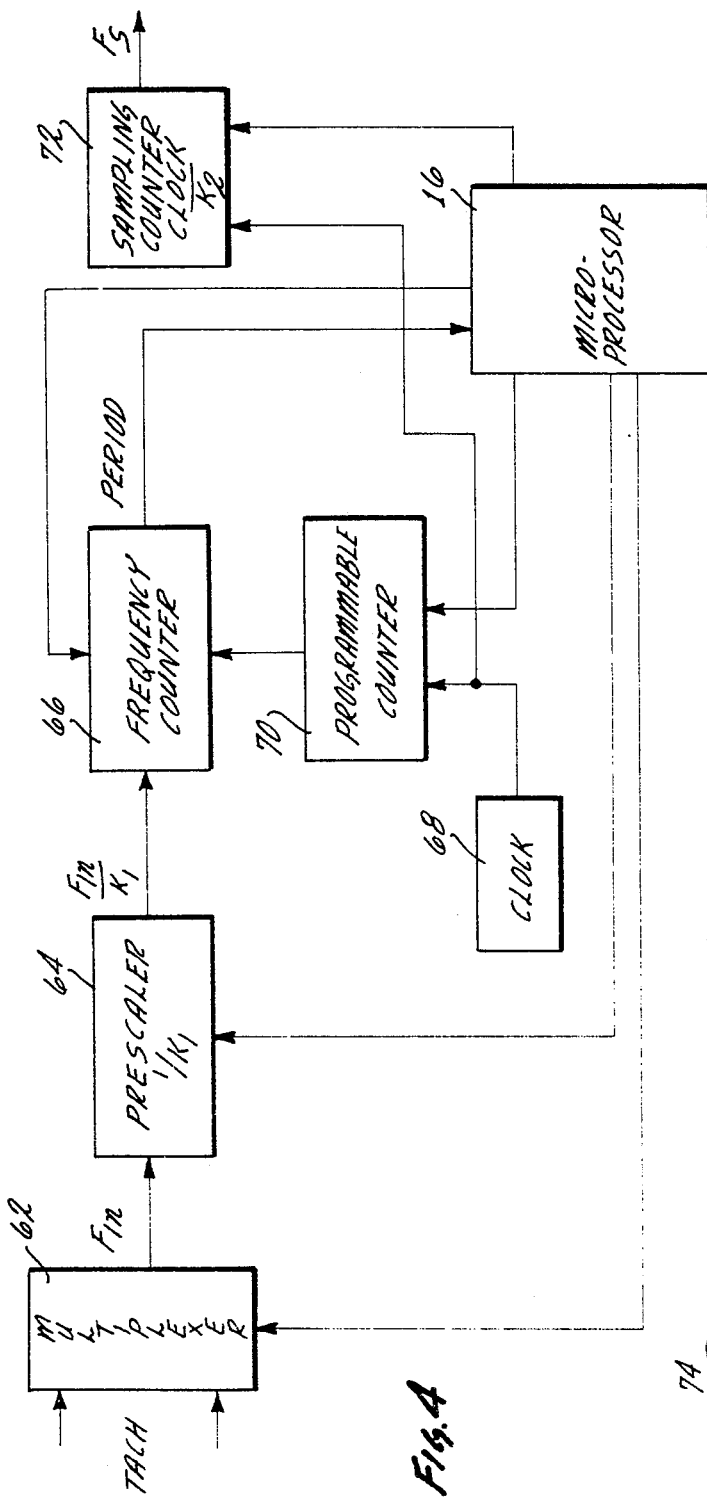
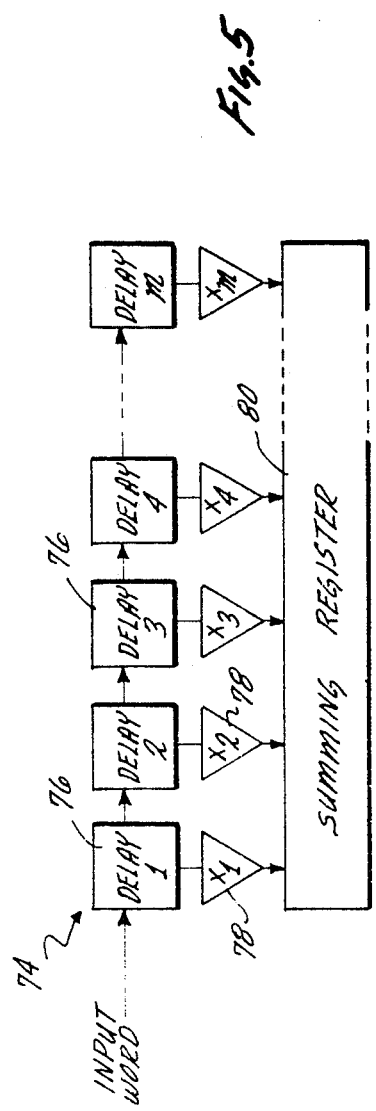

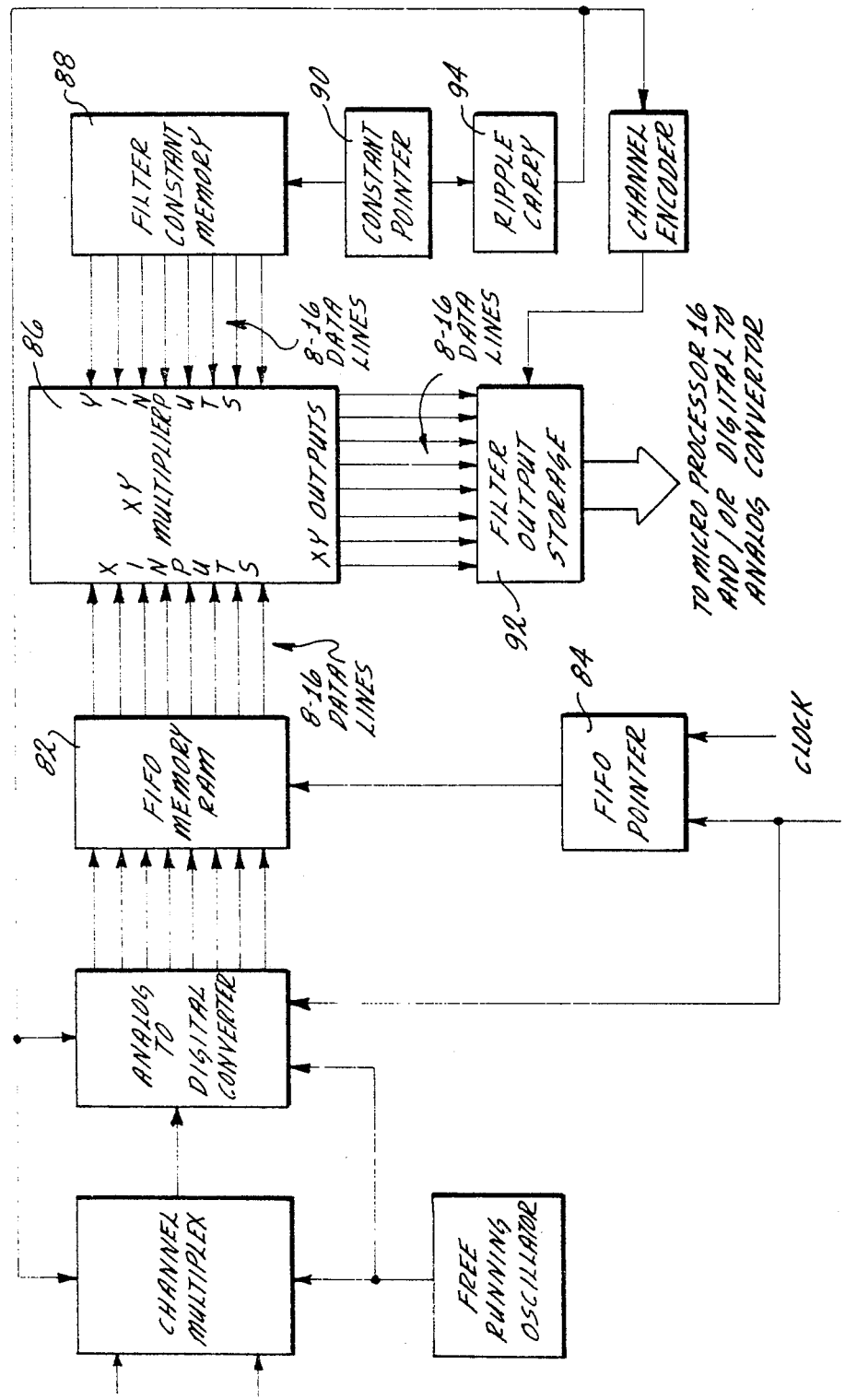

VIBRATION MONITORING SYSTEM FOR AIRCRAFT ENGINES

The present invention relates to vibration monitoring systems and, more particularly, vibration monitoring systems for jet aircraft engines.

BACKGROUND OF THE INVENTION

The detection and analysis of vibration in machines having large rotating components has long been known and utilized as a technique to detect incipient failures. Even techniques of limited reliability were deemed desirable because of the catastrophic consequences of failures, not only in terms of the destructive potential of a failed rotating component, but also because of the economic losses resulting during the time required to repair or replace such components or entire machines.

The problem of incipient failure is a more serious one when the machine with the rotating component is an aircraft jet engine. The modern engine includes several concentrically mounted shafts, each rotating at a slightly different frequency. Each of the rotating shafts or spools can include a compressor-turbine assembly which in turn includes fan and turbine blades. In the intake stages the blades are used to compress incoming air, and in the output stages the blades drive the compressor.

Machinery having massive rotating components, such as jet aircraft engines but also including large motor generators, turbines and the like, may experience bearing failures or may, through problems of wear or accident, become unbalanced and impose unacceptable loads upon the bearing and the shaft housings.

The problem, of course, is of greatest gravity when a passenger-carrying jet airliner is involved. The large fans and turbines, which are integral parts of the jet engine, can, upon catastrophic failure, penetrate the aircraft hull and cause substantial injury to the cabin and occupants, as well as impair the air worthiness of the aircraft.

For some time, techniques have been available to monitor the vibrations of rotating machinery and to signal dangerously high vibration amplitues or, at least, signal large incremental changes over the otherwise normal patterns of vibration. Such techniques are also available to assist in the balancing of the rotating components to keep vibrations at acceptably low levels. Limiting vibration has long been deemed a factor in prolonging the life of the bearings.

While such techniques are applicable to aircraft, the environment of the modern jet engine tends to create a high "noise" level due to the sympathetic vibrations of component parts of the aircraft. When operating, the jet engine generates a broad spectrum of frequencies including harmonics which usually excite most if not all resonances. Accordingly, it is difficult to monitor the vibrations that are directly related to the main rotating components of an engine in the presence of all of the other components of "noise".

Prior art techniques have utilized filters in an attempt to isolate the vibrations attributable to the engine components, and these filtered signals are then processed to provide a quantitative display that a trained observer could interpret. The observer, noting the amplitude over a period of time can then judge if a malfunction is threatened or if one exists.

In the prior patent to Cochard, U.S. Pat. No. 4,213,114 of July 15, 1980, a system was disclosed utilizing collocated transducers which were alternately sampled. A broad-band channel is used which includes a broad-band filter whose output is integrated, rectified and, if selected, can be displayed. The integrater output is also applied to two or more narrow band channels corresponding to the co-axial shafts which have different frequencies of rotation.

A tachometer is associated with each shaft and is used to control phase-locked loop frequency multipliers whose outputs are applied to monostable circuits which control conventional analog tracking filters, the output signals of which depend only on the amplitude of the basic frequency of the input signal from the integrater.

It has been found that analog circuits in general must be designed for specific applications, and further, tend to be susceptible to noise and electrical disturbances which could adversely affect the integrity of the output signals. Further, the frequencies of interest, which range from 20 Hz to 200 Hz, are not easily accommodated in analog circuits.

According to the present invention, a system based upon a digital computer has been created which converts the analog output of a transducer, such as an accelerometer, into digital signals. The tachometer signals are easily provided as a pulse train whose frequency is related to the frequency of the rotating component of interest. Standard digital components, including counters and memory devices, are utilized to generate a sampling pulse train, whose frequency is a predetermined, integral fraction of the frequency of the rotating component, so that a suitable number of samples of the accelerometer output can be digitized to represent adequately the quantities sensed by the transducer.

A nonrecursive digital filter is created utilizing a memory in which coefficients are stored. Each digitized sample is processed through the digital filter to create a digitized output. The digital computer then converts the filter output to an RMS value which is converted in a digital to analog converter, and the resultant analog signal can be applied to drive a meter display.

Because a general purpose digital computer is employed in conjunction with memory, the apparatus can, through programming, be adapted to perform other functions. For example, vibrations at virtually any frequency of interest can be detected and displayed.

In-flight balance determinations can be made as well as trend analysis for maintenance of the rotating component. The memory can store and retain instances of extreme vibrational amplitude or other transitory events for study and later analysis. The same apparatus can be adapted for different machinery, different frequencies, and the programmable digital filter can be reprogrammed to exhibit special or different characteristics. The digital computer provides the appropriate clock frequencies for tracking and performs the desired analysis.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 4 is a more detailed block diagram of the tachometer signal conditioning elements of FIG. 1;

FIG. 5 is a simplified diagram of a non-recursive digital filter; and

FIG. 6 is a detailed block diagram of a non-recursive digital filter according to the present invention.

Figure 1:
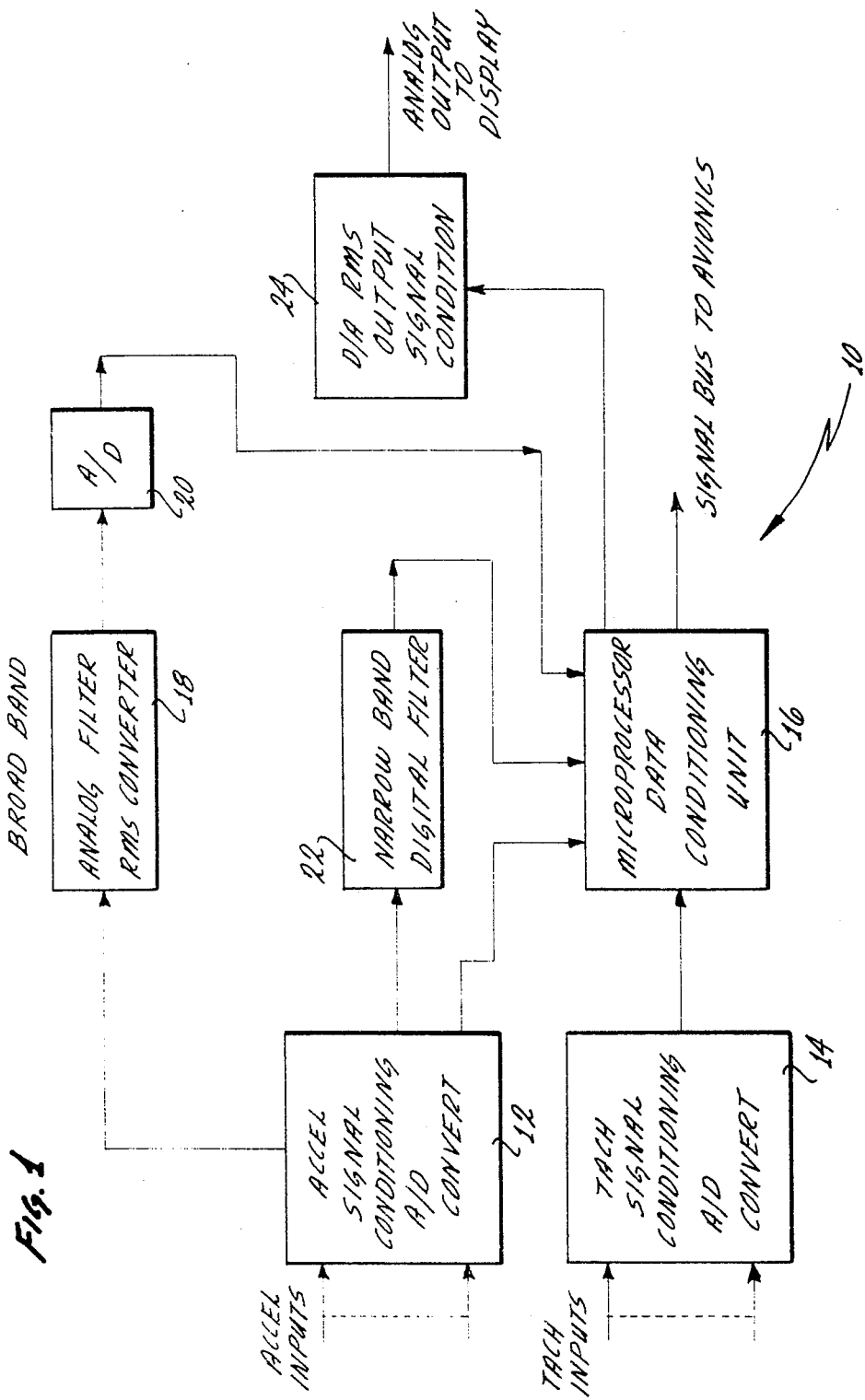
FIG. 1 is a block diagram of a vibration analysis system according to the present invention.

Turning first to FIG. 1, there is shown in block diagram form, a vibration analyzing system 10 which is adapted to operate and monitor the vibration of an aircraft jet engine. A plurality of inputs from accelerometers mounted on one or more jet engines, are applied to an accelerometer signal conditioning and analog to digital converter unit 12. Signals from a plurality of tachometers, monitoring each major rotating component of each jet engine to be monitored are applied to a tachometer signal conditioning and analog to digital converter unit 14. The resulting digital signals from the accelerometer signal conditioning unit 12 and the tachometer signal conditioning unit 14 are applied to a microprocessor-based data conditioning unit 16.

Because the industry is more accustomed to dealing with velocity signals rather than acceleration signals, an integration stage is included in the analog acceleration signal conditioning circuitry 12. The conditioned accelerometer signals, still in analog form, are applied to a broad band analog filter and RMS converter 18 the output of which is applied to an analog to digital converter 20. The signals, now in digital form, are supplied to the microprocessor-based signal conditioning unit 16. The microprocessor data conditioning unit 16 generates data sampling signals which are related to the tachometer input. As the rotation rates of the various components vary, the sampling rate must also vary, so that the same, predetermined number of samples per cycle are obtained. The data sampling signals are used to gate accelerometer signals into the analog to digital converter portion of the accelerometer signal conditioning unit 12. The digitized accelerometer signals from the accelerometer signal conditioning and A to D converting unit 12 are applied to a narrow band, nonrecursive digital filter network 22, the output of which is applied to the microprocessor-based data conditioning unit 16.

The microprocessor-based data conditioning unit or micro-processor 16 supplies digital output signals representing desired information to an output signal conditioning circuit 24, which converts the digital signals to analog signals to drive appropriate display devices.

Under control of the microprocessor-based data conditioning unit 16 and analog switches (not shown), the accelerometer outputs from the instruments on a particular jet engine are filtered at the rotational frequency of each of the major rotating components of the engine.

For example, if the aircraft utilizes a pair of collocated accelerometers on each engine, and each engine has three rotating spools, $N_1$, $N_2$ and $N_3$, then in separate computations, the system of the present invention will measure the RMS velocity, which can be scaled to any description such as peak or average value of vibration, from each of the accelerometers at the frequency of each of the spools. The use of a nonrecursive digital filter enables a much narrower band width with substantial suppression of noise outside the pass band.

Figure 2:
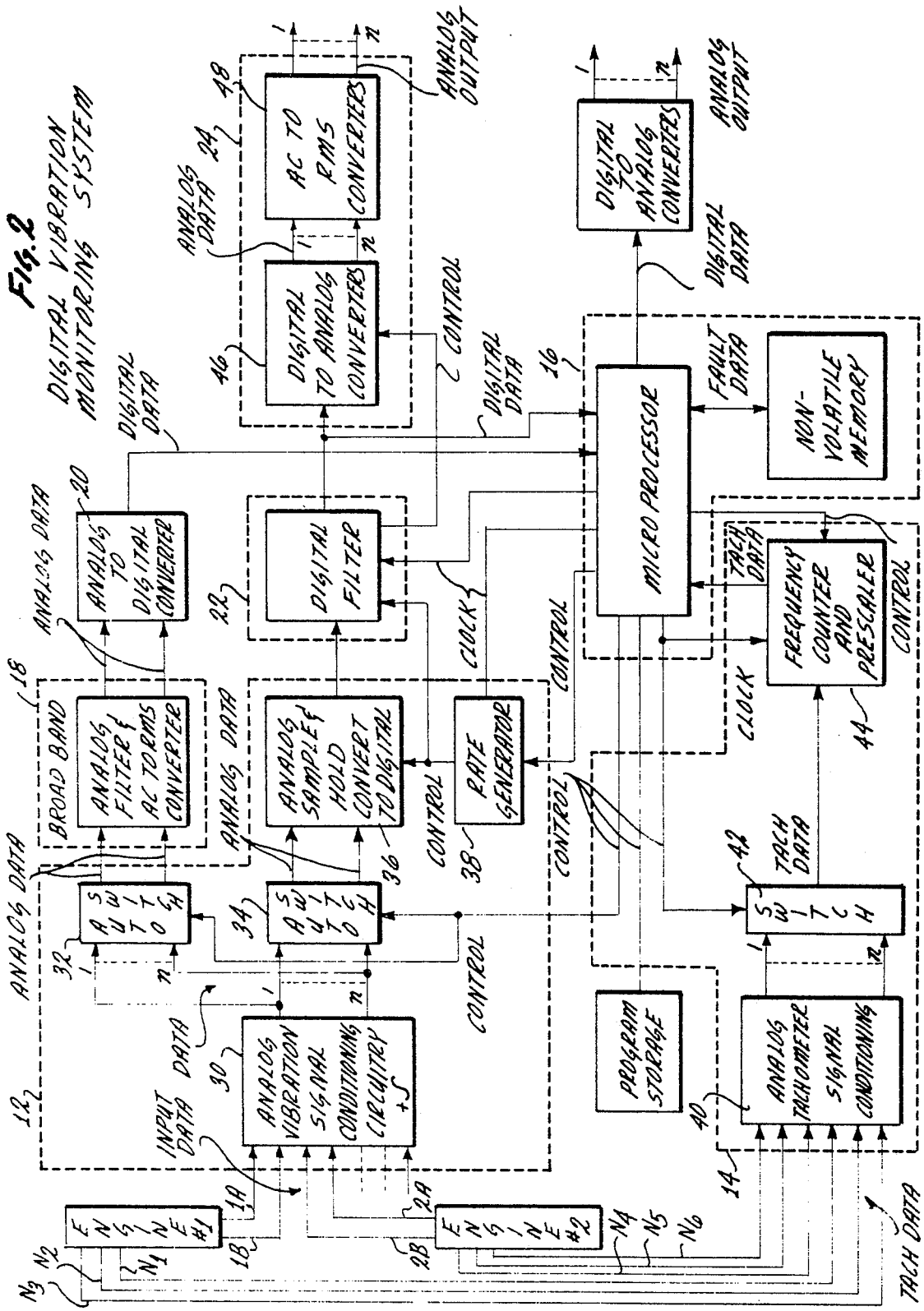
FIG. 2 is a block diagram in somewhat greater detail of the preferred embodiment of the system of FIG. 1.

Turning next to FIG. 2, there is shown in a more detailed block diagram, the system 10 as adapted to operate in conjunction with a twin engine aircraft, each engine of which has three rotating spools, each capable of rotating at a different frequency. As shown in FIG. 2, engine #1 has spools $N_1$, $N_2$ and $N_3$. Associated with engine #1 are accelerometers 1A and 1B. Engine #2, similarly, has rotating spools $N_4$, $N_5$ and $N_6$, and vibrations are detected by accelerometers 2A and 2B.

The analog output signals of the accelerometers 1A, 1B, 2A, 2B that are mounted on the engines are transmitted over appropriately labeled output lines from the blocks designated "ENGINE 1" and "ENGINE 2". It is understood that these blocks include the spools as well as the accelerometer transducers and the tachometers that are installed on the engines without a separate showing of such components.

The accelerometer signal conditioning block 12 includes an integrating circuit as a part of the analog vibration signal conditioning circuitry 30 which, on several lines, applies velocity data to first and second switching devices 32, 34. The first switching device 32 applies selected analog signals to the broad band analog filter and RMS converter 18. The second switching device 34 applies analog data to a sample and hold circuit 36, which includes an analog to digital conversion capability.

A programmable counter/rate generator 38 is controlled by the microprocessor 16 to sample the velocity signals at a predetermined rate, based upon the frequency of rotation. In the preferred embodiment, the sampling rate is 18 samples per rotational cycle, or a sample for each 20 degrees of rotation. The sampled analog signal is then converted into a digital signal which is applied to the narrow band non-recursive digital filter 22.

The tachometers that signal the rotational speed of the spools apply their output signals on signal lines designed N1–N6 from the "ENGINE 1" and "ENGINE 2" blocks. Depending on the configuration of the aircraft, the tachometers may signal the passage of fan blades or may signal the passage of gear teeth.

The tachometer analog input data is applied to the tachometer signal conditioning block 14 which includes analog tachometer circuits 40 which are connected to a switch 42 for selecting a particular tachometer input. A frequency counter and prescaler 44 includes a programmable counter coupled to the microprocessor 16. The frequency counter and prescaler 44 converts the tachometer input, generally a multiple of the rotational frequency, to a signal train having a rate more nearly equal to the actual rotating frequency.

This can be accomplished through the use of a high speed speed (for example 2 MHz) clock within the frequency counter and prescaler 44 which is counted down by a predetermined constant. The constant is supplied by the microprocessor 16. The output of the prescaler 44 would then be a pulse train at either the frequency of rotation or, a predetermined multiple of that frequency.

The microprocessor 16 utilizes the information supplied by the frequency counter and prescaler 44 to determine the constant that must be inserted into the rate generator 38 so that the sampling intervals will represent a data input every 20 degrees of rotation.

The output of the digital filter 22 is applied to the microprocessor 16 for data comparison and to check the validity of the system. The digital filter 22 applies data to a digital to analog converter 46 which, in turn, provides analog data to an RMS converter 48 for driving display devices.

Figure 3:
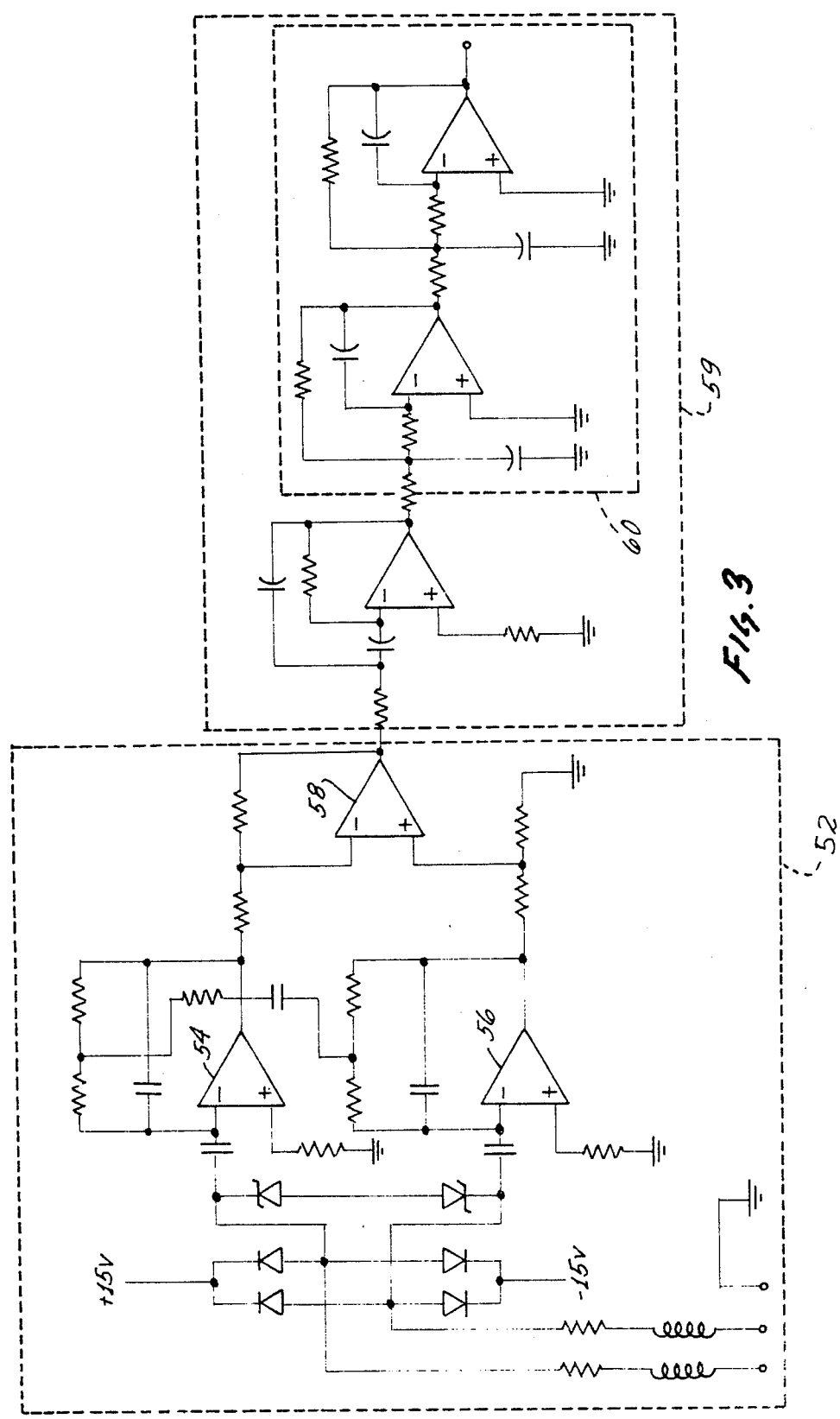
FIG. 3 is a detailed diagram of the accelerometer signal conditioned circuits of FIG. 1.

The accelerometer signal conditioning circuits 12 of FIG. 1 are illustrated in greater detail in FIG. 3. The circuits for one accelerometer are illustrated and it will be understood that, depending upon the circurmtances, either the circuit can be duplicated and dedicated to each accelerometer, or a single circuit can be shared among several accelerometers.

In the preferred embodiment, a differential output piezo-electric accelerometer is utilized to detect vibration. A general characteristic of such an accelerometer is that the output signal is a charge which must be converted to a voltage.

Illustrated is a conventional charge amplifier 52 which includes a pair of differential amplifiers 54, 56 driving the two inputs of a third differential amplifier 58, thereby converting the input charge signal to a low impedance, single ended millivolt output.

A conventional integrater circuit 59 is connected to the output of the charge amplifier 52, which has the effect of changing the acceleration representing signals into velocity representing signals. A simple, low pass filter circuit 60 is added to provide attenuation of frequencies above 200 Hz and to avoid any foldback effects resulting from the sampling of the input at the predetermined rate.

The tachometer signals are treated in the tachometer signal conditioning circuits 14 which are described in greater detail in FIG. 4. The several tachometer inputs are applied to a switching multiplexer 62 which, under control of the microprocessor 16, selects one of the tachometer inputs.

Because the tachometer input is a rate that is frequently a multiple of the frequency of rotation of the component under examination, it is preferable to divide out such multiple to provide a pulse train that is at or near the frequency of the rotating component. For example, if the tachometer provides a frequency, Fin, of 60 pulses per revolution of a spool by counting rotor blades, then, in this application, the constant $K_1$ would be equal to 60.

A prescaler 64 is adapted to have a constant $K_1$ inserted by the microprocessor 16. The constant is then a fixed count by which the input signal Fin is divided to provide a pulse train output at approximately the frequency of the rotating component. This pulse train is applied to gate a frequency counter 66, which is connected to count a clock of predetermined frequency.

In the present invention, a 2 MHz clock generator 68 is counted down in a programmable counter 70. The programmable counter 70 can be preset with numbers supplied by the microprocessor 16, so that the output of the counter 70 will be a pulse train of any desired frequency that is less than 2 MHz. If a constant, such as 200, is inserted into the programmable counter 70, the counter 70 pulse train output will be at a rate of 10,000 pulses per second, with a pulse period of 0.1 ms.

If now this clock pulse train is gated by the output of the prescaler 64, then a number will be generated that is representative of and corresponds to the period of the rotating element, expressed as a count. The frequency counter 66 can be arranged under the control of the microprocessor 16 so that only a single period need be timed.

The number, representing the tire required for one rotational interval is applied to the microprocessor 16. Since a sampling rate of 18 samples per rotation is desired, a sampling pulse train is needed whose period is 1/18th the period of the rotating component.

Based upon the number generated in the frequency counter 66, a number $K_2$ is then retrieved from the microprocessor data conditioning unit 16 which can then be used to count down a clock to provide a pulse train Fs that is the signal at the desired sampling rate. For example, for a rotational rate of 200 Hz, in order to get 18 samples per cycle, a constant $K_2=555$ would generate a pulse train $F_s$ of the proper frequency. The number $K_2$ is inserted into a sampling counter 72 which receives the raw 2 MHZ clock from the clock generator 68. The output of the sampling counter 72 is now a pulse train whose frequency, Fs, is 18 times the frequency of the rotating component.

The sampling pulse train Fs is used to control the analog-to-digital circuits 36 that digitize the velocity representing analog signals, which are derived from the accelerometers. As a result, at each 20° interval of rotation, the sign and magnitude of the velocity signal can be quantized and is available, in digital form, for digital filtering.

The universality of the present system becomes evident when it is recognized that virtually any tachometer can be utilized. With the "prescaler" 64, the system can easily be programmed to accomamdate various tachometers so that a pulse train, generally at the frequency of rotation of the rotating component of interest, can be available. Similarly, the period of rotation can be expressed in varying degrees of precision by appropriate selection of the constant which is used as the divisor in the programmable counter 70 that divides down the high frequency clock.

Further, since the microprocessor 16 can do either table lookups or computations, an appropriate constant $K_2$ can be entered into the sampling counter 72, so that the high frequency clock can be divided down to the desired sampling frequency, that has been predetermined to be 18 times the frequency of rotation of the component of interest.

Other techniques of the prior art, such as the use of a phase lock loop multiplier to process the tachometer inputs, would require that a different multiplier circuit be designed for every possible tachometer installation that provided a different number of pulses per revolution. Further, the operating frequencies encountered generally tend to be far below the frequencies at which a phase lock loop multiplier is effective and reliable.

Turning next to FIG. 5, there is shown in simplified diagrammatic form, the structure of a typical nonrecursive digital filter 74. As shown, the filter 74 includes a plurality of delay elements 76 each of which can store one sample, expressed in digital form of the input signal information. As shown, the filter includes M delay elements 76 where M is a number sufficiently large to produce reasonable filtering. The sample in each delay block is multiplied by a different weighting function in a multiplier element 78.

The theory of digital filtering is taught in a book entitled Digital Filters by R. W. Hamming, published by Prentice-Hall and copyrighted in 1977. Further, additional insight can be obtained from a review of the book, Theory and Applications of Digital Signal Processing by Rabiner and Gold, copyright 1975 by Bell Telephone Laboratories and The Lincoln Laboratories of the Massachusetts Institute of Technology, and published by Prentice-Hall.

The output of each multiplier element 78 is accumulated in a summing register 80. An output is then avaialble after each sampling. However, because the filter is shared among the several components that are being monitored, at least 256 samples are required before the data is reliable and representative.

In operation, coefficients are selected which provide a gain of two or more in the digital filter. The signal output from the filter is inhibited until a full number of valid samples have been stored in the delay elements 76. In the present example, the filter includes 256 stages, accordingly the output of the summing register 80 is suppressed until 256 samples have been received from a given sensor, are stored in the delay element 96 and processed through the multiplier elements 78.

Once the delay line is loaded, then each succeeding sample can result in a meaningful filter output which can be applied to the microprocessor 16 for further analysis. The output can also be converted to an analog signal and applied to drive a cockpit display, in the case of an aircraft.

A nonrecursive digital filter 74' useful in the present system is illustrated in detail in FIG. 6. The digitized sample is applied to a first-in first-out, random access memory 82 in which a predetermined number of samples are stored. A "pointer" 84 is an addressing counter which can access each of the memory locations to successively present the contents of each to an X-Y Multiplier and Summation circuit 86.

The pointer 84 is arranged so that it "rests" after each cycle at a different address, so that each new data sample can be stored in a different location. When a predetermined number of "new" samples have been presented to the memory, the stored values from a "prior" cycle will be discarded and replaced by updating samples.

A second, Constant storage memory 88, of a "size" equal to the number of stages in the digital filter, stores the various coefficients that are used in achieving the digital filter. A constant pointer 90 or counter is used to cycle through the various address locations of the constant memory 88.

As each location of the random access memory 82 and the constant memory 88 is addressed, their contents are applied to the multiplier 86 and the product of the two inputs is accumulated. In a cycle, each stored value in the random access memory 82 will be multiplied by a different constant in the constant memory 88. When each constant has been addressed, a cycle is completed and the sum of the products is transferred to a filter output storage element 92 which in turn, applies the resultant quantity to the microprocessor 16 and also to a digital to analog converter for presentation to the display circuits.

The random access memory pointer 84 includes a count which remains constant through a complete cycle of memory addresses. This fixed number, however, is changed by one from cycle to cycle, which has the effect of presenting the address holding the "oldest" value so that it can be replaced by the newest value from the detector circuit. The constant pointer 90 merely recycles. It has the effect of multiplying each stored sample with a different coefficient, so long as that sample remains in the memory.

In a preferred embodiment, especially adapted to work with two, collocated accelerometers, the random access memory 82 is doubled in size to accommodate samples from both accelerometers. A ripple carry element 94 signals the completion of each cycle through the constant memory 88. The ripple signal is applied to the switching systems and the sampler circuit as well as the addressing portions of the random access memory pointer circuit 84 so that a second, substantially duplicate memory stores the signals from the second accelerometer. The stored number within the pointer 84 is then changed only after both a first cycle involving a sample from the first accelerometer and a second cycle, involving a sample from the second accelerometer have been completed.

Appropriate information signals are provided to the microprocessor 16 so that the resultant data from the fiter output elements 92 can be correctly interpreted. The use of a memory to store the coefficients defining the digital filter, permit the coefficients to be easily changed or modified, depending upon the properties desired in the nonrecursive digital filter.

In the present example, the filter may be considered as a 256 sample delay line which, if 18 samples per cycle are utilized, can simultaneously hold approximately $14\frac{1}{4}$ rotational cycles of sensor information. These sensors' output signals include sign as well as magnitude. Therefore the summation of all of the samples should substantially cancel all random noise excursions and accentuate recurring perturbations.

Thus, there has been disclosed a new and improved vibration monitoring system for rotating components. Digital techniques are employed extensively to allow the system to be used with a wide variety of sensors, tachometers over the rotational frequency range of aircraft jet engines. The system, because it is digital, can be used at much lower frequencies, as well, since digital, rather than analog techniques are utilized to generate the sampling signals as well as to accomplish the filtering of the sampled signals. The digital techniques also permit the filter to track the rotational frequency and to easily center upon that frequency.

Digital techniques also permit the use of a variety of tachometer and frequency determining techniques so that a tachometer which operates at many times the frequency of the rotating component can easily be accommodated in the present system and a pulse trained substantially at the frequency of rotation can be easily created.

A pair of accelerometers can easily be employed since simple switching techniques can enable alternate sampling of the accelerometer signals. Further, the nonrecursive digital filter can easily be constructed to accomaodate signals from more than one sensor and well known multiplexing techniques permit the digital filter to be time shared between a pair of collocated accelerometers. Further, if the system is installed in a multi-engine aircraft, then each of the engines and their several "spools" can be accommodated with no particular change in apparatus.

Modifications and variation of the present invention will become apparent to those skilled in the art. Accordingly, the scope of the invention must be determined by the claims appended hereto.

What is claimed as new is:

1. Apparatus to monitor rotating machinery for incipient failures signalled by increased vibration at frequencies related to the frequency of rotation, comprising, in combination:
  (a) sensing means connected to detect and signal vibrations of an element of rotating machinery;
  (b) tachometer means for detecting and signalling frequency of rotation of the rotating element;
  (c) clocking means coupled to receive said tachometer means signals for generating a predetermined number of sampling pulses for each rotation of the element;
  (d) sampling means coupled to said sensing means, and responsive to said sampling pulses for gating sensing means signal samples;
  (e) digital conversion means coupled to said sampling means for producing digital signals corresponding to and representative of samples of sensed element vibrations;
  (f) nonrecursive digital filter means coupled to said digital conversion means and operable in response to each digitized sample to produce digital signals corresponding to and representative of vibrations of the element occurring at the frequency of rotation; and
  (g) signal processing means connected to receive the output of said filter means for converting digital signals to analog signals and for generating a signal representative of a desired descriptor of the quantity represented by the digital filter output signal;
whereby desired descriptor analog signals corresponding to and representative of periodic machine vibration can be displayed or further processed.

2. The apparatus of claim 1, wherein said sensing means include an accelerometer and means for integrating acceleration representing signals to produce velocity representing signals.

3. The apparatus of claim 1, wherein said clocking means generates a sampling pulse for each 20° of rotation of the element.

4. The apparatus of claim 1, wherein said sensing means include a pair of collocated accelerometers;
  said sampling means includes switching means for alternatively sampling the output of each of the accelerometers of said pair; and
  said digital filter means include selecting means for alternating between samples from each of said pair of accelerometers.

5. In a vibration analysis system, means for sampling periodic phenomema at predetermined increments of the period comprising:
  (a) tachometer means for sensing and signalling the frequency of the period;
  (b) dividing means coupled to said tachometer means to generate a first pulse train at a frequency of approximately one pulse per cycle;
  (c) timing means coupled to said dividing means to provide an output signal corresponding to and representative of the time interval between successive pulses of said first pulse train;
  (d) computing means coupled to said timing means for determining and signalling the frequency of a sampling pulse train that will subdivide each time interval precisely into a predetermined number of desired sampling intervals; and
  (e) sampling means coupled to said computing means for generating a train of sampling pulses each separated by one of said desired sampling intervals;
whereby as the rotational frequency signalled by said tachometer means varies, the sampling interval is correspondingly modified so that the periodic phenomenon is continuously sampled at predetermined increments of the period.

6. The means for sampling a periodic phenomenon of claim 5 above wherein said computing means determines a frequency rate to subdivide each period into 18 sampling intervals, corresponding to data samples at 20° intervals.

7. The means for sampling a periodic phenomenon of claim 5 above wherein said dividing means include a first presettable counter for dividing said tachometer means output by a predetermined constant.

8. The means for sampling a periodic phenomenon of claim 5 above wherein said timing means include a second counter coupled to a precision clock for generating output signals, said first counter being connected to count output signals of said second counter, and being enabled and disabled by successive pulses of said first pulse train, whereby the stored count in said first counter is a numerical representation of the period.

9. The means for sampling a periodic phenomenon of claim 5 above wherein said sampling means include a third, presettable counter coupled to said computing means for dividing an applied, relatively high frequency clock by a supplied predetermined constant to generate said train of sampling pulses.

10. Apparatus to monitor rotating machinery for incipient failures signalled by increased vibration at frequencies related to the frequency of rotation, the rotating machinery including sensing means connected to detect and signal vibrations of an element of rotating machinery and tachometer means for detecting and signalling frequency of rotation of the rotating element, comprising the combination with;
  (a) clocking means coupled to the tachometer means for generating a predetermined number of sampling pulses for each rotation of the element;
  (b) sampling means coupled to the sensing means and said clocking means, and responsive to said sampling pulses for gating samples of the sensing means signals;
  (c) digital conversion means coupled to said sampling means for producing digital signals corresponding to and representative of sensing means signal samples of sensed rotating element vibrations;
  (d) nonrecursive digital filter means coupled to said digital conversion means and operable in response to applied digital signals representing each digitized sample to produce filter output digital signals corresponding to and representative of vibrations of the rotating element occurring at the frequency of rotation; and
  (e) signal processing means connected to receive the signal output of said digital filter means for converting said filter output digital signals to analog signals and for generating a signal representative of a desired descriptor of the quantity represented by the filter output digital signal;
whereby desired descriptor analog signals corresponding to and representative of periodic machine vibration can be displayed or further processed.

11. The apparatus of claim 10, wherein said clocking means generates a sampling pulse for each 20° of rotation of the element.

12. The apparatus of claim 10, wherein the sensing means include a pair of collocated accelerometers;
  said sampling means further including switching means for alternatively sampling the output of each of the accelerometers of the pair; and
  said digital filter means further including selecting means for alternating between samples from each of the accelerometers of the pair.

* * * * *